Jan. 5, 1960

A. J. DOVEY 2,919,937

PIPE COUPLING HAVING INFLATED SEALING MEANS

Filed July 30, 1956

ARNOLD J. DOVEY
INVENTOR.

BY *Fulwider, Mattingly
and Huntley*
ATTORNEYS.

United States Patent Office 2,919,937
Patented Jan. 5, 1960

2,919,937

PIPE COUPLING HAVING INFLATED SEALING MEANS

Arnold J. Dovey, Los Angeles, Calif., assignor, by mesne assignments, to Federal-Mogul-Bower Bearings, Inc., Detroit, Mich., a corporation of Michigan Application July 30, 1956, Serial No. 601,017

1 Claim. (Cl. 285—81)

The present invention relates generally to releasable couplings and more particularly to a new and improved releasable coupling for connecting abutting sections of conduit, pipe or duct employed to convey fluid under pressure.

Prior to the time an aircraft is airborne, it is common practice to heat, cool or otherwise condition its interior by means of ground-located equipment. The conditioned air is conveyed to the aircraft through comparatively long lengths of flexible ducting generally made up of several individual lengths or sections. It is necessary to provide releasable couplings between these adjoining sections of duct, the aircraft and the ground-located equipment. These couplings should be readily engageable and disengageable with respect to one another with a minimum expenditure of time and effort, especially since the couplings are often engaged and disengaged by a single operator working in extremes of weather conditions. Moreover, the operation of these couplings must be foolproof and once they are engaged they must remain engaged until the conditioning operation has been completed.

It is a major object of the present invention to provide a novel and improved releasable coupling for connecting abutting sections of duct.

Another object of the invention is to provide a releasable coupling of the aforedescribed nature which is readily engageable and disengageable and when once locked together will not become inadvertently unlocked.

A further object is to provide a releasable coupling of the aforedescribed nature which has but few parts and is light in weight and of compact size whereby it may be easily manipulated by a single operator.

Yet another object of the invention is to provide a releasable coupling which is simple in design and rugged of construction whereby it may afford a long and trouble free service life.

It is an additional object to provide a releasable coupling of the aforedescribed nature which is comparatively inexpensive to manufacture.

An important object of the invention is to provide a releasable coupling for use between connecting abutting sections of duct which will remain leak-free throughout its service life and which can handle either heated or cooled air with equal facility.

These and other objects and advantages of the present invention will become more apparent from the following detailed description, when taken in conjunction with the appended drawings, wherein.

Figure 1:
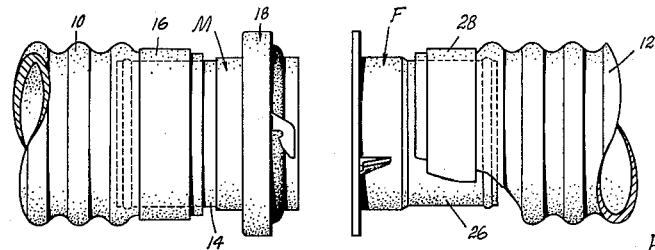
Figure 1 is a side elevational view of a preferred form of releasable coupling embodying the present invention and showing the coupling in a released and disengaged condition.
Figure 2:
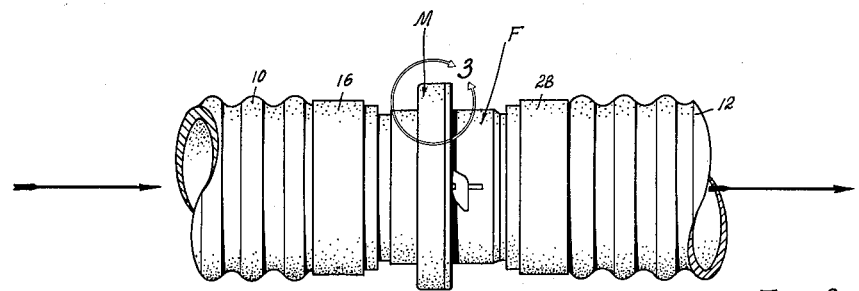
Figure 2 is a side elevational view similar to Figure 1 but showing the coupling in an engaged and locked condition.

Referring to the drawings, the preferred form of releasable coupling embodying the present invention includes a female member F secured to a first section of duct 10, and a male member M secured to the end of an adjoining second section of duct 12. The male and female members M and F are preferably of metallic construction. The sections of duct 10 and 12 are of flexible construction and when connected together are adapted to convey fluid such as air under superatmospheric pressure, as indicated by the directional arrows in Figure 2. The male member M is telescopically engageable with the female member F whereafter these members may be locked together against inadvertent separation.

More particularly, the male member M includes a base sleeve 14 which is rigidly affixed to one end of the duct 10 by a clamping ring 16. A cup-shaped seal support, generally designated 18, is rigidly affixed as by welding or brazing to the end of the base sleeve 14 remote from the duct 10. This seal support 18 includes an annular flange 20 which encompasses the base sleeve 14, a wall 22 extending radially outwardly from the flange 20 and an axially directed wall 24 which extends towards the female member F from the radially outer end of the wall 22. The flange 20 is affixed as by welding or brazing to the base sleeve 14.

The female member F includes a base sleeve 26 which is rigidly affixed to the duct 12 by a clamping ring 28. The portion of the base sleeve 26 remote from the duct 12 is flared radially outwardly so as to define a socket 30 that telescopically receives the portion of the male member's base sleeve 14 remote from the duct 10. A radially extending flange 32 is integrally formed on the end of the base sleeve 26 adjacent the male member F. This flange 32 has an outer diameter approximately the same as that of the seal support's wall 22.

Figure 4:
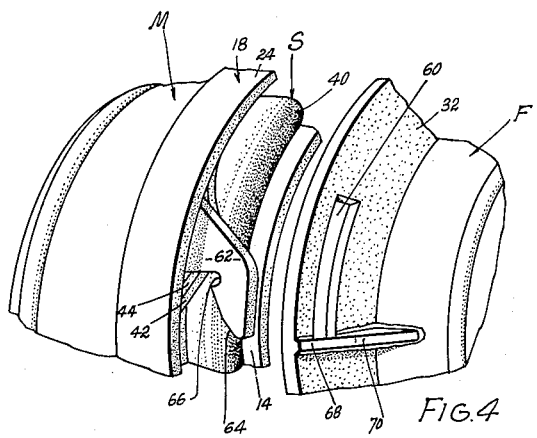
Figure 4 is a fragmentary, enlarged perspective view of lock elements employed with said coupling, said lock elements being shown in a disengaged condition.

A resilient, hollow seal ring S is disposed within the annular cavity 34 defined by the seal support 18 of the male member M. This seal ring S is formed of natural or synthetic rubber and it includes an inner wall 36 having a diameter slightly smaller than the outer diameter of the base sleeve 14. It also includes an outer wall 38 which is connected to the inner wall 36 by a side wall 40. The length of the side wall 40 equals approximately one-half of the length of the flange 22. A lip 42 extends radially outwardly from the opposite end of the outer wall 38. A second side wall 44 extends radially outwardly from the end of the inner wall 36 adjacent the flange 22. The radially outer end of this wall 44 approximately coincides with the radially outer end of the lip 42. The lip 42 is bonded or otherwise sealed to the portion of the side wall 44 adjacent thereto. Referring to Figure 4, it will be observed that the side wall 40 of the seal assumes a rounded configuration when the seal is in a relaxed condition. The interior 50 of the sealing ring S is in communication with the space encompassed by the male member M by means of one or more scoop tubes 52, shown particularly in Figure 3. The scoop 52 extends through radially aligned bores 54 and 56 formed, respectively, in the seal ring's inner wall 36 and the male member's drive sleeve 14. Preferably, the scoop tube 52 will be rigidly affixed as by welding or brazing to the base sleeve 14, but it is not affixed to the seal ring S. The radially inner portion of these scoops 52 are curved towards the direction of flow of the fluid being forced through the ducts 10 and 12.

Figure 5:
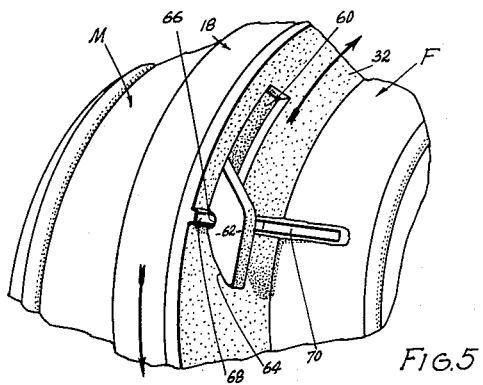
Figure 5 is a view similar to Figure 4 but showing the lock elements in a locked-together condition.

With particular reference to Figures 4 and 5, the female member's flange 32 is formed with a pair of diametrically opposed, arcuate slots 60 (only one of which is shown). These slots 60 have a center of curvature on the axis of the female member F. The slots 60 are adapted to removably receive a pair of axially extending claw elements 62, the end of the claw elements 62 remote from the female member F being rigidly affixed to the flange 22 of the seal support 18 as by welding or brazing. The free end of the claw elements are formed with a camming surface 64 which terminates in an axially extending lock notch 66. The lock notch 66 is adapted to be received by a radially extending keeper tongue 68 which is rigidly affixed to the female member F adjacent one end of the slot 60. A reinforcing gusset 70 is interposed between the inner portion of the keeper tongue 68 and the sleeve 30.

Referring now to Figures 4 and 5, when it is desired to lock the male and female coupling members together, the two claw elements 62 will be axially inserted into the two arcuate slots 60. Thereafter, the male and female members will be caused to undergo relative rotation in opposite directions, as indicated by the arrows in Figure 5. During this relative rotation the camming surfaces 64 of the two claw elements will ride upon the two keeper tongues 68 until the notches 66 are received by these tongues. The movement of the camming surfaces 64 over the keeper tongues 68 will cause the male and female members to undergo relative axial movement towards one another. This relative axial movement of these members will cause the side wall 40 of the seal S to be compressed towards the male member M. Accordingly, even though the seal S is in a relaxed condition its side wall 40 will exert an axial force against the flange 32 of the female member F tending to effect separation between the male and female members. Accordingly, the keeper tongues 68 will be urged axially into the confines of the lock notches 66 and the male and female members will be thereby locked against relative rotation.

Figure 3:
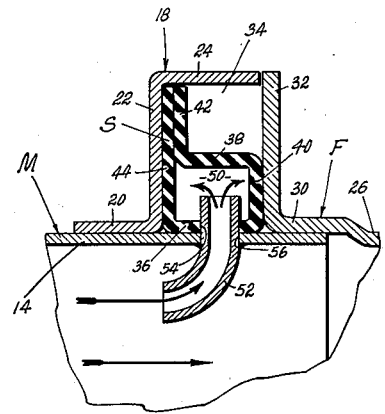
Figure 3 is an enlarged, fragmentary central vertical sectional view of the encircled area designated 3 in Figure 2.

Referring now to Figure 3, when a fluid under super-atmospheric pressure is forced through the ducts 10 and 12, the pressure thereof will be communicated to the interior 50 of the seal S by means of the scoop tube 52. Thus, the seal S will tend to be expanded into tight sealing engagement with the flanges 22 and 32 as well as with the outer periphery of the male member's base sleeve 14. It should be particularly noted that such expansion of the seal S will also tend to effect the axial separation of the male and female members with a force having a magnitude proportional to the pressure of the fluid. Hence, the greater the fluid pressure, the larger the magnitude of the force with which the keeper tongues 68 will be urged into the confines of the lock notches 66. It will likewise be apparent that the greater the fluid pressure, the more effective will be the sealing ability of the seal S. When the flow of fluid through the ducts 10 and 12 is discontinued, the male and female members may be unlocked by first effecting their relative axial movement towards one another so as to release the lock notches 66 from the keeper tongues 68 and thereafter effecting their relative rotation in directions opposite to that indicated by the directional arrows in Figure 5.

From the foregoing description it will be apparent that the male and female members may be readily engaged and disengaged even by a single operator. In this regard, it is possible to affix handles to the male and female members so as to expedite this operation. It will also be apparent that once the male and female members have been locked together, and a pressurized fluid is admitted to the ducts 10 and 12, these members cannot become inadvertently unlocked.

While there has been shown and described hereinabove what is presently considered to be a preferred embodiment of the present invention, it will be apparent that various modifications and changes may be made thereto without departing from the spirit of the invention or the scope of the following claim.

I claim:

A coupling for connecting a pair of duct sections, comprising: a female member on an end of one of said sections that terminates in a radially outwardly extending flange, said flange being formed with a pair of diametrically opposite arcuate slots adjacent the periphery of said flange that have their center of curvature on the axis of said member; a male member telescopically engageable with said female member; an annular cup-shaped seal support concentrically exteriorly affixed to said male member and including an outer wall axially directed towards said flange, said seal support and said flange together defining a substantially enclosed annular cavity; an annular inflatable tubular seal ring of an elastomeric material concentrically disposed within said seal support having a normal inner diameter less than the exterior diameter of said male member whereby when said seal ring is seated in said seal support said ring is elastically deformed to be axially elongated, and said ring being adapted for such elongation, when deflated, to an axial length greater than the axial length of said outer wall of said seal support to bias said members apart; a pair of axially extending diametrically opposed claw elements formed on said seal support outwardly of said seal ring and insertable through said slots when said members are engaged; a pair of radially extending diametrically opposed lock elements on said flange adjacent ends of said slots; a pair of complementary locking surfaces formed on said claw elements and lock elements adapted to releasably interconnect said elements after relative rotation in a first direction of said members and adapted to draw said outer wall of said seal support towards said flange as a result of said rotation to axially contract said seal ring; and a scoop tube in said male member whose radially inner end extends into the confines of said male member facing the direction of flow of a fluid through said member and whose outer end extends into the interior of said tubular seal ring whereby a super-atmospheric pressure of said fluid inflates said ring into sealing engagement with said flange and said male member and further tends to bias said members apart, whereby said claw elements and lock elements are securely coupled together.

References Cited in the file of this patent

UNITED STATES PATENTS

| 31,806 | Buhler | Feb. 17, 1905 |
| 872,463 | Schwabe | Dec. 3, 1907 |
| 1,051,805 | Danberg | Jan. 28, 1913 |
| 1,589,469 | Homand | June 22, 1926 |
| 2,057,645 | Hamilton | Oct. 13, 1936 |
| 2,104,799 | Evans | Jan. 11, 1938 |
| 2,451,941 | Glover, Jr., et al. | Oct. 18, 1948 |
| 2,541,512 | Hahn | Feb. 13, 1951 |

FOREIGN PATENTS

| 1,184 | Great Britain | Mar. 18, 1881 |
| 61,739 | Germany | Apr. 1, 1892 |
| 70,652 | Germany | Sept. 19, 1893 |
| 19,766 | Great Britain | Oct. 17, 1894 |
| 943,835 | France | Oct. 11, 1948 |